Patented Feb. 7, 1956 — 2,734,070

2,734,070

BIS(DIHALOCYANOVINYL) TEREPHTHALATES

Etcyl H. Blair, Midland, Mich., assignor to The Dow Chemical Company, Midland, Mich., a corporation of Michigan No Drawing. Application May 19, 1954, Serial No. 430,991

3 Claims. (Cl. 260—465)

The present invention is concerned with the bis(dihalocyanovinyl) terephthalates having the formula

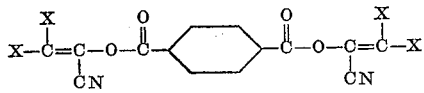

In this and succeeding formulae, X represents halogen. These new ester compounds are crystalline solids somewhat soluble in many common organic solvents and of very low solubility in water. They are particularly useful as bactericides and fungicides and are adapted to be employed as active toxic constituents of compositions for the control of many common bacterial and fungal organisms such as *Staphylococcus aureus* and *Aspergillus terreus*.

The new bis(dihalocyanovinyl) terephthalates may be prepared by mixing or otherwise blending a bis(trihalocyanoethyl) terephthalate of the formula.

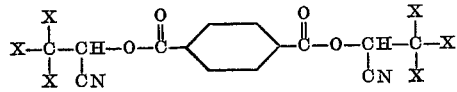

with pyridine to effect a dehydrohalogenation reaction from which results the desired esters. The reaction conveniently may be carried out in an inert organic solvent such as carbon tetrachloride and benzene. Good results are obtained when two or more molecular proportions of pyridine are reacted with one molecular proportion of the bis(trihalocyanoethyl) terephthalate reagent. The reaction is somewhat exothermic and takes place smoothly at a temperature of from 10° to 90° C. The temperature may be controlled by regulating the rate of contacting the reactants and/or by the addition and substraction of heat, as desired. Upon completion of the reaction, the desired product may be separated by conventional methods, e. g. washing with water, filtration, decantation and evaporation of the reaction solvent.

The bis(trihalocyanoethyl) terephthalates employed as starting materials in the aforedescribed process, are crystalline solids which are somewhat soluble in many organic solvents and of very low solubility in water. They may be prepared by mixing together (1) terephthaloyl dichloride and (2) chloral cyanohydrin or bromal cyanohydrin at a reaction temperature at which hydrogen chloride of reaction is formed from the carbonyl halogen of the terephthaloyl dichloride and the hydroxyl hydrogen of the cyanohydrin reagent. The reaction conveniently may be carried out in an inert organic solvent such as toluene, chlorobenzene and dichlorobenzene. Good results are obtained with one molecular proportion of terephthaloyl dichloride is reacted with two molecular proportions of the cyanohydrin reagent. The reaction proceeds smoothly with the formation of the desired product and hydrogen chloride of reaction at temperatures of from 100° to 210° C. In carrying out the reaction, substantially all of the carbonyl halogen of the terephthaloyl dichloride reactant may be recovered as hydrogen chloride. Following the reaction, the desired bis(trihalocyanoethyl) terephthalates may be separated by conventional methods, e. g. washing with water and dilute aqueous alkali metal carbonate, filtration, decantation and evaporation of reaction solvent. These compounds and methods for their production are disclosed in a copending application Serial No. 430,992, filed concurrently herewith.

In a representative operation, 5 grams (0.062 mole) of pyridine was mixed with 4.5 grams (0.01 mole) of bis(2,2,2-trichloro-1-cyanoethyl) terephthalate (melting at 163°–165° C.) dissolved in 100 milliliters of benzene and the resulting mixture heated for 5 minutes at a temperature of 50° C. The mixture was then diluted with 100 milliliters of benzene and the resulting product washed with water. Following the washing operation, the solvent was removed by evaporation on a steam bath. As a result of these operations, there was obtained a bis(2,2-dichloro-1-cyanovinyl) terephthalate product as a crystalline residue. The latter was recrystallized from ethanol and found to melt at 199°–200° C.

In a further operation, 0.2 mole of pyridine is mixed with 0.1 mole of bis(2,2,2-tribromo-1-cyanoethyl) terephthalate dissolved in 300 milliliters of benzene and the resulting mixture set aside for 16 hours at room temperature. The mixture is then washed with water, and the solvent removed therefrom by evaporation. As a result of these operations, there is obtained a bis(2,2-dibromo-1-cyanovinyl) terephthalate product as a crystalline residue.

I claim:

1. A bis(dihalocyanovinyl) terephthalate of the formula

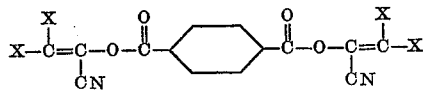

wherein X represents a member of the group consisting of bromine and chlorine.

2. Bis(2,2-dichloro-1-cyanovinyl) terephthalate.

3. A process for the manufacture of a dihalocyanovinyl terephthalate having the formula

wherein X represents a member of the group consisting of bromine and chlorine, which comprises mixing together at a temperature of from 10° to 90° C. (1) pyridine and (2) a bis(trihalocyanoethyl) terephalate of the formula

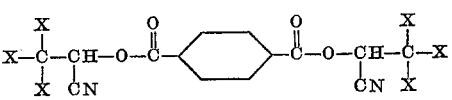

wherein X is as defined above.

References Cited in the file of this patent

UNITED STATES PATENTS

| | | |
|---|---|---|
| 2,326,373 | Long | Aug. 10, 1943 |
| 2,467,373 | Dutcher | Apr. 19, 1949 |